March 28, 1967     L. R. LINSTROM     3,311,746
ELECTRON BEAM DEVICE FOR MEASURING THE DISPLACEMENT
OF ONE BODY RELATIVE TO ANOTHER
Filed June 3, 1964
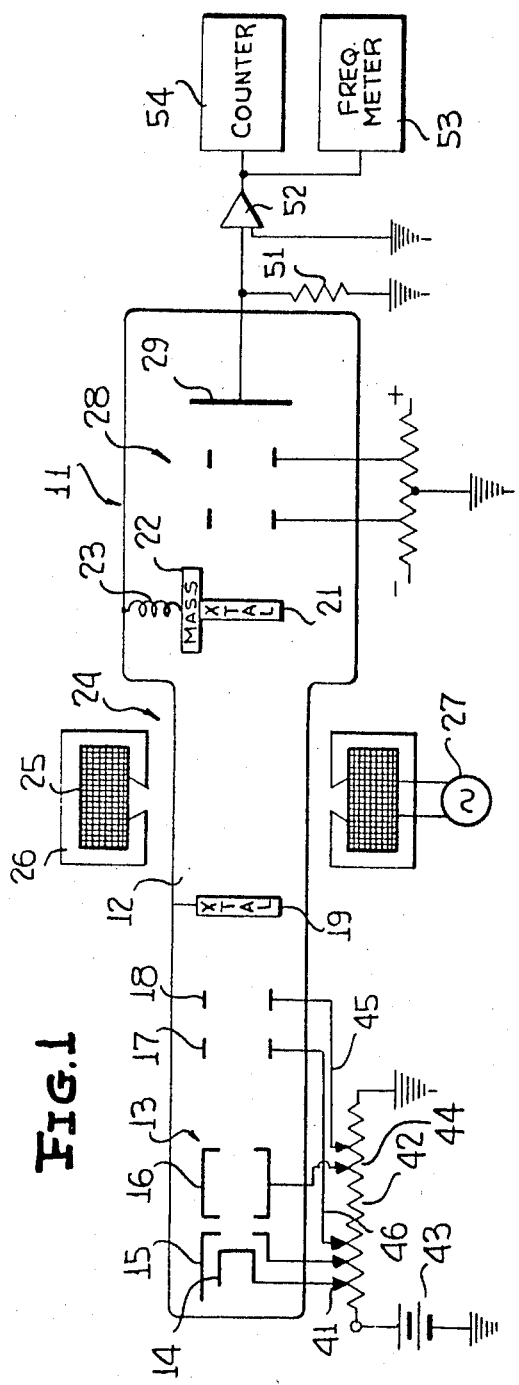
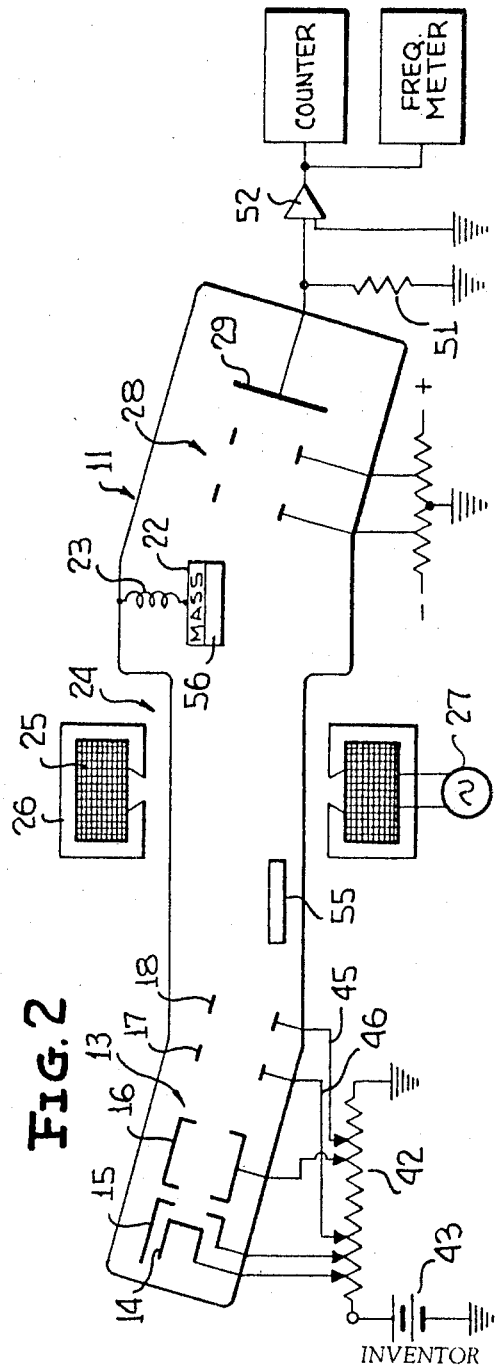
INVENTOR
LOREN R. LINSTROM
BY Hurvitz & Rose
ATTORNEYS

United States Patent Office 3,311,746
Patented Mar. 28, 1967

3,311,746
ELECTRON BEAM DEVICE FOR MEASURING THE DISPLACEMENT OF ONE BODY RELATIVE TO ANOTHER
Loren R. Linstrom, North Springfield, Va., assignor to Melpar, Inc., Falls Church, Va., a corporation of Delaware
Filed June 3, 1964, Ser. No. 372,180
12 Claims. (Cl. 250—49.5)

The present invention relates generally to devices for measuring minute displacements and velocities of a mass by interference fringe counting and more particularly to devices of said class wherein the fringes are formed in response to electron beams impinging on a crystal lattice grating.

As is well known, the displacement and velocity of one object relative to another can be determined with optical interferometer, fringe counting techniques. The resolution of such systems is limited to displacements on the order of magnitude of a wavelength of light in the visible spectrum, approximately 5000 A. For many applications this is sufficient resolution for satisfactory measurements.

For very accurate seismometers, accelerometers and in microminiature manufacturing and testing process, displacement measurements on the order of one A. are necessary. To date, electron microscopy has been the only known technique having the resolution required for measurements in the region of interest. Electron microscopy, however, does not lend itself to facile information readout. It requires constant observation of an image screen by a human operator or camera.

The present invention provides a system for measuring displacements on the order of 1 A. and does not have the disadvantages attendant with electron microscopy by employing electron beam diffraction or moire fringe techniques. In practicing the invention, an electron beam is derived from a gun and collimated by conventional electron optic techniques. The collimated electron beam, having wavelength characteristics on the order of 2 to 12 A., impinges on a crystal diffraction grating. The crystal lattice structure serves as a diffraction grating with approximately 2 to 3 A. spacing so that a multiplicity of parallel pencil electron beams derive from it. These beams impinge on a second crystal diffraction grating that is displaceable relatively to the first crystal. Deriving from the second crystal is a second plurality of parallel electron beams. As one crystal moves relatively the other, in response to the displacement being measured, the wave energy deriving from the second crystal alternately interferes and adds with itself. Thus, there is derived a series of moving interference fringes commensurate with the minute relative displacements of the two crystals. Because the crystal grating spacings are on the order of 2 to 3 Angstroms and the electron beam wavelengths are on the same magnitude order, displacements of approximately 1 A. can be detected.

Detection is accomplished by divergently focusing the moving fringe pattern onto an electron collector. By counting the number of fringe patterns with conventional digital apparatus, relative displacement between the crystals is determined. Velocity of one crystal relative to the other is determined by coupling the electron beam pulse output to a suitable frequency meter.

According to one embodiment of the invention, one or both diffraction gratings are composed of very thin (about 1000 A.) planar crystals. Because the crystals are so thin, electron beams impinging on them propogate through to the side opposite to that on which the beam originally was directed. This requirement for thinness, however, causes difficulty in machining the crystal to appropriate dimensions. This problem is overcome, according to a second embodiment, by utilizing highly polished crystal gratings that reflect the electron beam wave energy. Of course, reflecting crystals do not have the thinness requirements of crystals that are essentially transparent to an electron beam.

An important feature of the present invention includes insertion of electron optics between the relatively movable crystals. The electron optics prevent divergence of the beam emanating from the first crystal, focuses the beam on the second crystal so its size is identical with that of the beam deriving from the first crystal, and rotates the beam so the second crystal grating lines and the electron beam impinging on it are longitudinally aligned. Preventing beam divergence enables the crystals to be separated from each other by a reasonable distance. Controlling the beam size allows crystals from the same batch to be utilized for both gratings. This, of course, is desirable because the problem of finding crystals with compatable lattice orientations and spacings is, at best, difficult.

Another advantage attendant with the present invention is its inherent vacuum requirement so that a seismic or inertial mass can be included in a vacuum with the remainder of the device. Inclusion of such a mass in vacuo adds considerably to the accuracy of seismic and acceleration measurements because detrimental influences of convection currents, temperature conduction and pressure variations on the position of the mass are virtually obviated.

It is, accordingly, an object of the present invention to provide a new and improved device for measuring displacements as small as approximately 1 A., which device is adaptable for use in conjunction with digital readout techniques so that human and photographic observation are not necessary.

Another object of the invention is to provide an electron beam system for measuring displacements on the order of 1 A. wherein crystals are utilized as diffraction gratings, which crystals are separated from each other by a reasonable distance and are taken from the same batch.

An additional object of the invention is to provide an electron beam system employing a pair of reflective crystal diffraction gratings so that machining problems associated with crystals that are substantially transparent to electron beams are obviated.

A further object of the invention is to provide a new and improved seismometer or accelerator wherein the basic measuring device is in vacuo so that the inertial mass can be readily mounted in a vacuum.

The above and still further objects, features and advantages of the present invention will become apparent upon consideration of the following detailed description of one specific embodiment thereof, especially when taken in conjunction with the accompanying drawings, wherein:

FIGURE 1 is a schematic diagram illustrating an embodiment of the invention utilizing electron permeable crystals; and FIGURE 2 is a schematic diagram illustrating a further embodiment wherein electron reflecting crystals are employed.

Reference is now made to FIGURE 1 wherein the reference numeral 11 denotes the exterior wall of vacuum chamber 12. Within chamber 12, there is provided collimated electron beam source 13.

Source 13 includes cathode 14, biased to a relatively large negative potential, by tap 41 on voltage divider 42 that is connected between ground and negative D.C. potential source 43. Source 13 also includes hollow beam forming electrode 15 and accelerator 16. The voltage applied to accelerator 16 by tap 44 on potentiometer 42 is sufficiently positive relative to the voltage of cathode 14 (on the order of 100,000 volts) to excite electrons in the beam to a potential of between 10,000 and 100,000 electron volts. Such excitation causes electrons in the beam to have wavelengths between approximately 12 and 4 A., respectively, in accordance with the expression $$\lambda = \frac{12.263}{\sqrt{V}}$$

where $\lambda$=electron wavelength in Angstrom units and $V$=electron beam potential in electron volts.

The accelerated electron beam deriving from accelerator 16 is focused into a collimated beam by electrostatic focusing rings 17 and 18, respectively maintained at negative and positive potentials relative to accelerator 16 by potentiometer taps 45 and 46.

The parallel electron beams emanating from cathode ray structure 13 impinge on one face of fixedly positioned planar crystal 19, having a thickness on the order of 1000 A. Crystal 19, which may be of any suitable material, such as mica sheets, lead dioxide or magnesium sulphide, has a crystal lattice structure with crystal spacings between two and four A. These spacings form a diffraction grating for the electron beam so that there is derived from the output side of crystal 19 multiple, discrete parallel electron beams with substantially identical wavelength characteristics.

Situated about six or seven inches downstream from crystal 19 is second crystal 21, preferably made from the same material and batch as crystal 19, and of approximately the same thickness as the first crystal. Crystal 21 is mounted on inertial body 22, having a mass of approximately 1 kilogram. Body 22 is secured to the interior wall of envelope 11 by spring 23 so that accelerations of envelope 11, due to seismic forces for example, result in vertical translation of crystal 21 relative to rigidly secured crystal 19. Because mass 22 is situated in vacuum chamber 11 it is not subject to ambient changes in temperature and pressure or to convection currents. In consequence, its size and mass is not subject to variations so that crystal 21 is translated vertically solely by accelerations that the envelope undergoes.

Centrally positioned between crystals 19 and 21 is magnetic focusing system 24 that includes annular coil 25 and pole piece 26, both of which surround the neck of envelope 11. Coil 25 is excited by A.C. source 27 and is positioned such that the diverging electron beams deriving from crystal 19 are focused onto crystal 21 with a one to one area relation. Also, focusing system 24 rotates the parallel beams deriving from crystal 19 so that they strike the gratings of crystal 21 at the same angle from which they emanated from the gratings of crystal 19. Thus, the diffraction gratings of crystals 19 and 21 are aligned relative to the electron beam even if they are not so aligned physically. Because the electron beams focused on crystal 21 have the same size as those deriving from crystal 19, the two crystals may be taken from the same batch to provide gratings with the same spacings.

Deriving from crystal 21 are substantially the same number of electron beams as impinged on it. The intensity of each beam depends upon the relative position of crystal 21 gratings relative to the apparent position of crystal 19 gratings. When crystals 19 and 21 are in one set of positions, the gratings of the latter block passage of the waves associated with the electron beam. In another position, the electron beam waves are passed through grating 21. The combined electron wave characteristic deriving from crystal grating 21 as it is translated relatively to grating 19 thus appears as alternate large and small amplitude fringes of very small cross section. A single fringe is formed by the combined effects of all the electron beams for each relative position of crystal 19 and 21.

Because the fringes are of very small cross section, so small that detection is virtually impossible, there is provided electron optic system 28, for diverging the beam image before it strikes collector 29. Electron optic system 28 includes electrostatically charged rings 31 and 32, respectively responsive to negative and positive D.C. voltages derived from grounded center tapped potential divider 33.

In operation, a 1 A. movement of crystal 21 causes a 180° phase reversal in the fringe deriving from crystal 21 and impinging on collector 29. Such a phase reversal causes a transistion in the current supplied by collector 29 to resistor 51. Such a transition is detected by amplifier 52 that derives a pulse in response to it. Amplifier 52 supplies its output in parallel to frequency meter 53 and counter 54 to derive indications of the relative velocity and total movement of crystals 19 and 21. If the exact location of crystal 21 is desired, collector 29 is split into two segments, the output of each being arranged to drive a separate input of a reversible counter, as taught in U.S. Patent 2,479,802.

Reference is now made to FIGURE 2 wherein transparent crystal gratings 19 and 21 of FIGURE 1 are replaced with highly polished, reflective crystal gratings 55 and 56, which may be made from any suitable material such as rock salt. Crystal 55 is fixedly mounted within chamber 11 so that its polished reflecting face is positioned to intercept the collimated electron beam deriving from source 13, which is translated upwardly relative to its position in FIGURE 1. The reflecting face is inclined approximately 30° relative to the propagation direction of the electron beam striking it. Thereby, the diffracted beam deriving from crystal 55 is reflected upwardly and to the right so it strikes crystal 56. The polished face of crystal 56 extends horizontally within chamber 11 by virtue of its connection to inertial body 22 and spring 23 so that its movement provides an indication of the vertical acceleration that the system undergoes. Crystal 56 serves as a further diffraction grating for the electron beams reflected from the polished face of crystal 55. From the polished, reflecting face of crystal 56 there is derived a series of fringes in precisely the same manner as described supra for crystal 21 of FIGURE 1. The fringes reflected from crystal 56 impinge at right angles on collector 29, positioned at an acute angle relative to the walls of chamber 11.

While the principles of the present invention are applicable with other types of corpusclar energy having wavelength characteristics on the order of 5 A., e.g., X-rays, gamma rays and proton beams, the use of electron beams is desirable over any of these. Desirability results from the relatively facile generation and focusing of electron beams.

While I have described and illustrated one specific embodiment of my invention, it will be clear that variations of the details of construction which are specifically illustrated and described may be resorted to without departing from the true spirit and scope of the invention as defined in the appended claims.

I claim:

1. A system for measuring displacement of one body relative to another comprising means for forming a collimated electron beam, a pair of relatively moveable crystals, said crystals having lattice separations on the same order of magnitude as the wavelength of electrons in said beam, one of said crystals intercepting said collimated electron beam to derive a plurality of separate electron beams, the second crystal intercepting the electron beams deriving from said one crystal and deriving electron beam fringes in response to relative movement of said crystals, and means for detecting said fringes.

2. The system of claim 1 wherein at least one of said crystals is so thin as to be transparent to an electron beam.

3. The system of claim 1 wherein the face of at least one of said crystals intercepting an electron beam is polished to reflect the electron beam it intercepts.

4. The system of claim 1 further including a system of electron optics interposed between said crystals, said optic system converging the electron beams deriving from said one crystal onto said second crystal.

5. The system of claim 4 wherein said crystals have substantially identical lattice spacings, and said electron optic system is adjusted to focus said beams on said second crystal with substantially the same cross section as when they derived from said one crystal.

6. The system of claim 4 wherein said optical system is adjusted to rotate said beams on said second crystal so that the beams intercept the lattice structure of said second crystal as if it were parallel to the lattice structure of said first crystal.

7. The system of claim 4 wherein said crystals have substantially identical lattice spacings, and said electron optic system is adjusted to focus said beams on said second crystal with substantially the same cross section as when they derived from said one crystal, and to rotate said beams on said second crystal so that the beams intercept the lattice structure of said second crystal as if it were parallel to the lattice structure of said first crystal.

8. The system of claim 1 wherein said means for detecting includes means for indicating displacement of one crystal relative to another.

9. The system of claim 1 wherein said means for detecting includes means for indicating velocity of one crystal relative to another.

10. The system of claim 1 further including electron optic means disposed between said second crystal and said means for detecting, said electron optic means diverging the area of the fringe deriving from said second crystal.

11. A system for measuring relative displacement, comprising means for forming a beam of electrons, means for exciting electrons in said beam to produce electron wavelengths of between approximately 4 and 12 Angstroms, means for collimating said beam, a pair of spaced relatively movable crystals in the path of said collimated beam, said crystals having lattice separations of the order of magnitude of the electron wavelengths, the lattice structure of the first of said crystals thereby forming a diffraction grating for said electron beam to produce a plurality of discrete parallel electron beams having substantially identical wavelength characteristics upon passage of said collimated beam therethrough, means for focusing said parallel beams on the second of said crystals to produce incidence of said beams on the lattice of said second crystal at substantially the same angle as that angle from which said parallel beams emanated from the lattice of said first crystal to produce a series of moving interference fringes dependent upon relative displacement of said first and second crystals, and means for detecting the fringe pattern to determine said relative displacement.

12. A system for measuring displacement of one body relative to another comprising a vacuum envelope having located interiorly thereof: means for forming a collimated electron beam, a pair of relatively moveable crystals, said crystals having lattice separations on the same order of magnitude as the wavelength of electrons in said beam, one of said crystals intercepting said collimated electron beam to derive a plurality of separate electron beams, the second crystal intercepting the electron beams deriving from said one crystal and deriving electron beam fringes in response to relative movement of said crystals, means for detecting said fringes, one of said crystals being secured to an inertial mass, and inertia means for securing said mass to an interior wall of said envelope.

References Cited by the Examiner

UNITED STATES PATENTS

| | | | |
|---|---|---|---|
| 2,281,325 | 4/1942 | Ramo | 250—49.5 |
| 2,422,807 | 6/1947 | Smith | 250—49.5 |
| 2,857,802 | 10/1958 | Cail | 88—14 |
| 3,105,901 | 10/1963 | Ladell et al. | 250—51.5 |
| 3,218,911 | 11/1965 | Bower et al. | 88—14 |

RALPH G. NILSON, *Primary Examiner.*

W. F. LINDQUIST, *Assistant Examiner.*